Jan. 21, 1969          H. O. CORBETT          3,423,010
PLASTIC LAMINATED BAG STRUCTURE HAVING CURLED EDGES
Original Filed March 9, 1964          Sheet 2 of 2
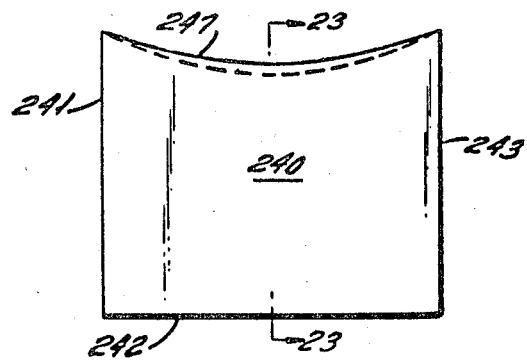
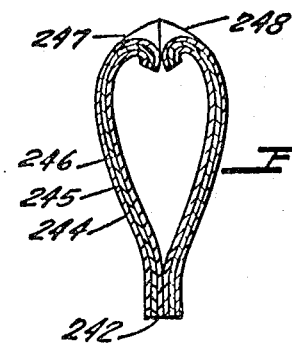
INVENTOR.
HERBERT O. CORBETT
BY Allen A. Meyer, Jr.
ATTORNEY

United States Patent Office 3,423,010
Patented Jan. 21, 1969

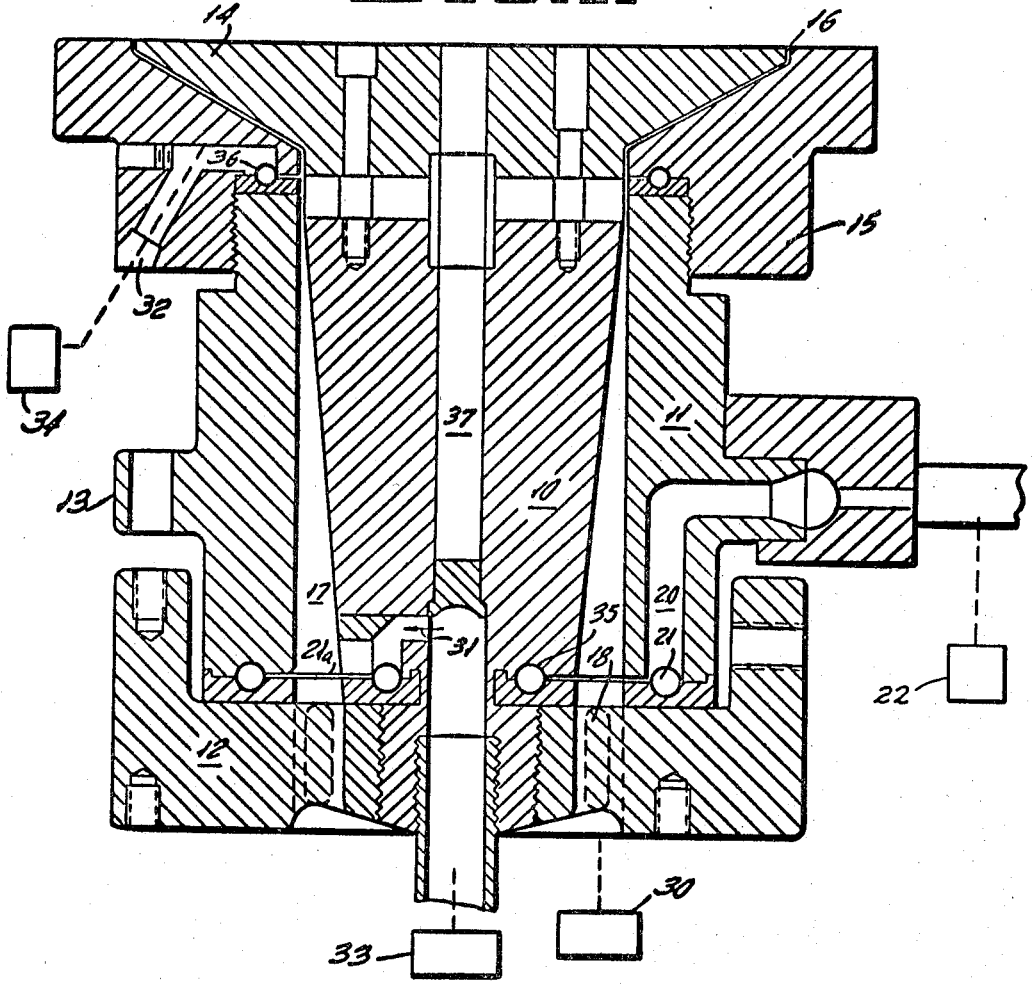

3,423,010
PLASTIC LAMINATED BAG STRUCTURE HAVING CURLED EDGES
Herbert O. Corbett, Bridgeport, Conn., assignor to National Distillers and Chemical Corporation, New York, N.Y., a corporation of Virginia
Original application Mar. 9, 1964, Ser. No. 350,220. Divided and this application May 26, 1967, Ser. No. 654,942
U.S. Cl. 229—53   2 Claims
Int. Cl. B65d 33/00

ABSTRACT OF THE DISCLOSURE

A plastic is formed of front and rear panels which are each laminates of two plastic films. The plastic films of the panels have different shrinkage stresses so that the free edges of the panels at the bag opening tend to curl out of the plane of their respective panels to permit easy gripping of the bag opening.

---

This application is a division of application Ser. No. 350,220, filed Mar. 9, 1964, in the name of Herbert O. Corbett, entitled Laminated Products, and Methods and Apparatus for Producing Same, and assigned to the assignee of the present invention.

This invention relates to novel apparatus and methods for the production of novel laminated products and more specifically relates to the production of laminated products wherein two or more overlying and coextensive fluid films are formed with laminar flow and, after forming of the laminar streams, are extruded through a common extrusion die orifice, the laminated sheet undergoing a lateral extension with a substantially zero coefficient of friction at the interfaces of the laminated products. By laminar flow is meant the flow of two or more adjacent streams without turbulence so there is no mixing of the materials of the streams. The present invention particularly recognizes that laminarly flowing adjacent streams can undergo a lateral extension without causing normally expected turbulence due to the adherence between the stream surfaces.

There is a widespread need for laminated materials, in flat sheets or tubes in many varied applications.

By way of example, the seal range of presently used low density high melt index overwrap plastic film is relatively critical. In accordance with the invention, one side of the film can have a surface laminated thereon of high density, low melt index film, while the other side of the film can be of relatively stiff material. As another example, two separate streams could be laminated to insure a pinhole-free product. Again, materials of different compositions and different colors could be internally laminated to produce a desired structure or form some desired pattern. Many other novel products which can be formed in accordance with the invention as described in copending application Ser. No. 350,220.

Accordingly, a primary object of this invention is to provide a novel apparatus and method for producing laminated thermoplastic materials.

Another object of this invention is to provide a novel laminated film product in which the films in the laminate may have a thickness as small as 0.000066 inch, A further object of this invention is to provide a novel method for the formation of laminated film products wherein the laminated products are coextensive with one another and are joined by laminar flow within an extrusion die, and before discharge from the die orifice.

Yet another object of this invention is to laminarly join two films of plastic differing mechanical properties, and to extend the formed products with substantially no frictional effects occurring at the interface of the plastic laminae.

Another object of this invention is to provide a novel overwrap film having an increased seal range.

These and other objects of this invention will readily become apparent upon reading the following description of the accompanying drawings, in which:

FIGURE 1 shows a view in vertical section of an extrusion die adapted to join four laminates ahead of a common circular die orifice, wherein the extruder sources of the four streams are shown schematically.

FIGURE 2 shows a top plan view of the die of FIGURE 1.

FIGURE 3 shows a bag having inwardly curved panel sections to bias the bag open.

FIGURE 4 is a cross-section of FIGURE 3 across lines 23—23 of FIGURE 3.

Referring now to the drawings, in FIGURES 1 and 2 there is illustrated an extrusion die having a central mandrel 10 within an outer die body 11 adjustably connected to a die base 12 by suitable bolts connected from flange 13 in outer body 11 to base 12 in the usual manner. An inner ring 14 and outer ring 15 are suitably connected to mandrel 10 and outer body 11 respectively to define a circular die orifice 16. In this structure, various sizes of pairs of rings 14 and 15 can be used to obtain various diameters for orifice 16.

Orifice 16 communicates with annular channel 17, as shown, where channel 17 is connected to a first extruder schematically shown as extruder 30 which supports the die and forces a molten product under pressure through annular web 18 and into channel 17.

Up to this point, the die described is of a type well known to the art and operates to discharge an appropriately inflated tube of an appropriate polyolefin through orifice 16.

In accordance with the invention, a conduit 20 passes through body 11 and communicates with a suitable annular channel or passage 21, opening into the channel 17 through an annular orifice 21a in the outer wall of channel 17. The conduit 20 is connected to a second extruder or second source of plastic material, schematically shown as extruder 22, which material may be similar or dissimilar to the first material forced through web 18. Because of the laminar flow of molten material within channel 17 toward orifice 16, the material from orifice 21 coats the outside of the material coming through web 18, whereby the two streams are laminately joined under pressure prior to discharge from orifice 16. As the molten materials are ultimately passed through orifice 16, the resultant product is formed of two laminae which have the desired characteristics in its respective opposite surface portions. Moreover, the extruded tube may be distended to increase its diameter, without rupture of either laminae when the tube is inflated since, until the tube laminae are set by cooling, they have been found to have substantially zero friction at their interface.

Further, in accordance with the invention, a tube having any desired number of laminar plies can be formed. Thus, in FIGURE 1, two additional molten products may be injected into the die through channels 31 and 32 respectively which are connected respectively to extruders schematically shown as extruders 33 and 34. Channels 31 and 32 communicate with annular orifices 35 and 36 respectively which, in turn, communicate with the channel 17 through the respective inner and outer wall surfaces thereof.

During operation of the die of FIGURES 1 and 2, a gas under pressure is applied to the interior of the plastic tube, formed by the extrusion from die orifice 16, by way of the channel 37 in mandrel 10. Any suitable means can be used to introduce this gas into channel 37. With extruders 30 and 22 in operation, the material from extruder 22 and channel 21 will be deposited on the outer surface of the molten material from extruder 30 passing upwardly through channel 17. The laminated product will then be forced through orifice 16 with the resulting tube being formed of the two similar or dissimilar layers intimately bonded to one another.

When extruder 34 is also in operation, it will deposit a further layer of material on the layered material from extruder 22. The resultant tube leaving orifice 16 will then be comprised of a "3-ply" material with each layer having its own particular characteristics.

When extruder 33 is also in operation, it will deposit a further, and inner layer of material on the interior of the film moving up channel 17. Thus, a four-ply film will be forced through orifice 16 having an outer layer of the material from extruder 34, a second layer of material from extruder 22, a third layer of material from extruder 30, and an innermost layer of material from extruder 33.

In accordance with the present invention, prestressed film or sheets are formed wherein the film tends to curl. When this type film is used for the making of bags, the free ends of the bags will tend to curl inwardly or outwardly, thereby biasing the bag open. This novel arrangement is illustrated in FIGURES 3 and 4 which show a bag 240 having sealed edges 241, 242 and 243. Note that the bag could be formed of flat or tubular film. Where the bag is tubular, the bottom edge 242 is formed by sealing in the usual manner. The film is then formed of outer polyethylene layer 244 having a thickness of ½ mil, a central layer 245 of polypropylene having a thickness of 1 mil and an inner layer 246 of polyethylene having a thickness of 3½ mils. The upper edges 247 and 248 are seen to curl inwardly thereby biasing the bag open. This novel result is achieved by using different melt temperatures for the inner and outer layers 246 and 244 respectively. That is to say, when the product of FIGURES 3 and 4 is formed in the apparatus of FIGURE 1, the polyethylene melt from the extruder connected to channel 35 will be at a different temperature than the melt from extruder 34. Therefore, the cooling rates of the two layers are different so that, upon crystalization of the materials, there will be a built in stress tending to cause the material to curl as shown.

Note that this effect can be obtained from the differential cooling of at least two similar or dissimilar materials. Moreover, note that both channels 35 and 36 could be connected to the common extruder 34 with suitable heaters connected to the conduits leading to channel 35 to cause the difference in melt temperature.

The embodiments of the invention in which an exclusive privilege or property is claimed are defined as follows:

1. A plastic film bag comprising front and rear panels coextensive with one another; said front and rear panels joined together around a first portion of their periphery and separated from one another and having free edges along a second portion of their periphery, thereby to define a bag structure and an opening therefor; at least one of said front and rear panels consisting of first and second laminates; said first and second laminates having different internal shrinkage stresses; the free edge of said one of said panels normally curling out of the plane of said one of said panels, thereby to permit gripping of said free edge of said one of said panels to permit easy opening of said bag.

2. The bag of claim 1 wherein each of said front and rear panels are formed of first and second laminates having different internal shrinkage stresses; the free ends of each of said first and second panels normally curling out of the planes of their respective first and second panels.

References Cited
UNITED STATES PATENTS

| 2,932,323 | 4/1960 | Aries. | |
| 3,063,487 | 11/1962 | Mullin | 150—37 |

DAVID M. BOCKENEK, *Primary Examiner.*

U.S. Cl. X.R.

229—55

PO-1050
(5/69)

UNITED STATES PATENT OFFICE
CERTIFICATE OF CORRECTION

Patent No. 3423010          Dated    January 21, 1969

Inventor(s)    Herbert O. Corbett

It is certified that error appears in the above-identified patent and that said Letters Patent are hereby corrected as shown below:

Claim 1 of the patent should read as follows:

1. A plastic film bag comprising front and rear panels coextensive with one another; said front and rear panels joined together around a first portion of their periphery and separated from one another and having free edges along a second portion of their periphery, thereby to define a bag structure and an opening therefor; at least one of said front and rear panels consisting of first and second laminae; said first and second laminae having different internal shrinkage stresses; the free edge of said one of said panels normally curling out of the plane of said one of said panels, thereby to permit gripping of said free edge of said one of said panels to permit easy opening of said bag.

SIGNED AND
SEALED
JUN 9 1970

(SEAL)
Attest:

Edward M. Fletcher, Jr.
Attesting Officer

WILLIAM E. SCHUYLER, JR.
Commissioner of Patents